United States Patent [19]

Spruit

[11] Patent Number: 4,766,498
[45] Date of Patent: Aug. 23, 1988

[54] IMAGE PROJECTION SYSTEM

[75] Inventor: Johannes H. Spruit, Eindhoven, Netherlands

[73] Assignee: U.S. Philips Corporation, New York, N.Y.

[21] Appl. No.: 18,301

[22] Filed: Feb. 24, 1987

[30] Foreign Application Priority Data

Nov. 24, 1986 [NL] Netherlands .......................... 8602975

[51] Int. Cl.$^4$ .............................................. H04N 5/74
[52] U.S. Cl. ...................................... 358/237; 358/64
[58] Field of Search .................. 358/60, 64, 231, 237, 358/238, 250

[56] References Cited

U.S. PATENT DOCUMENTS

| 800,085 | 3/1974 | Ambats | 358/250 |
| 4,423,438 | 12/1983 | Nakamura | 358/231 |
| 4,672,458 | 6/1987 | Mckechnie | 358/231 |

FOREIGN PATENT DOCUMENTS 170320 2/1986 European Pat. Off. .
2091898 8/1982 United Kingdom .

Primary Examiner—Tommy P. Chin
Attorney, Agent, or Firm—F. Brice Faller

[57] ABSTRACT

An image projection system has at least one display tube provided with an interference filter for increasing the amount of light which is emitted within a small solid angle. Each display tube is combined with a projection lens system having a first lens element of positive power with an aspherical surface at the image end and a convex aspherical surface at the object end, which surface has a center of curvature in the image end half. A second lens element of negative power has a concave surface facing the image end, which is toward the first element, and an opposed surface which conforms to the display window of the display tube. A third lens element which is bi-convex may be located between first and second lens elements. The pupil of the lens system is located in the image end half of the first element. The brightness of the picture on a projection screen is enhanced while the brightness variation and the color shading of this picture are reduced.

9 Claims, 7 Drawing Sheets

IMAGE PROJECTION SYSTEM

BACKGROUND OF THE INVENTION

The invention relates to an image projection system comprising at least one display tube and a multi-element projection lens system for imaging a display tube picture on a projection screen. The display tube has a display screen in an evacuated envelope, the display screen being arranged on the inside of a display window in the wall of the envelope and being provided with a luminescent material, a multi-layer interference filter being arranged between said material and the display window. The invention also relates to a projection device provided with such an image projection system.

As is described in European Patent Application No. 0170230, use of an interference filter consisting of a large number of layers, for example fourteen to thirty, may considerably improve the display tube properties regarding the intensity distribution within and the monochromaticity of the beam emitted by the tube. The interference filter passes light of the desired wavelength in the direction perpencidulat to the display screen and in directions which extend at angles of, for example 30° at a maximum to the normal on this screen. These directions may be designated the forward directions. Light emerging from the luminescent layer at larger angles to the normal, up to approximately 90°, is reflected to this layer by the interference filter. This light is dispersed within the luminescent layer and is then emitted in the forward directions so that the brightness in these directions is enhanced. Such a tube can be used advantageously in a television projection system.

The light of wavelengths shorter than the desired wavelength is passed by the filter also at larger angles, so that for these wavelengths the gain in intensity in the forward directions is smaller than that for the desired wavelength. For wavelengths which are larger than the desired wavelength, the maximum angle at which the light passes through the filter is smaller than that for the light of the desired wavelength and the filter can even completely block the larger wavelengths in the forward directions. The interference filter therefore not only ensures that the emitted light is concentrated into a smaller solid angle thus enabling the amount of light received by the projection lens system to increase but it has also a wavelength-selective effect so that the risk of chromatic aberrations in the projection lens system is reduced and the projected image may have a better contrast.

It has been found that satisfactory results can be achieved when using display tubes provided with an interference filter in projection systems if such tubes are combined with projection lens systems having relatively larger focal lengths, for exampler of the order of 130 mm. For such a projection lens system the entrance pupil is at a relatively large distance from the display screen of the tube. The entrance pupil is defined as the image of the physical boundary or "stop" in the lens system, which image is formed by the lens elements which are present at the object end of this boundary. The entrance pupil is located at the position in which the chief ray of a beam obliquely incident on the lens system intersects the optical axis of this system. If the entrance pupil is located at a relatively large distance from the display screen of the tube, the field angle of the projection lens system is relatively small so that only the light emitted by the display tube in the forward directions is received by the lens system.

The object or image field angle as used herein means the angle between the optical axis of the lens system and the chief ray of a beam originating from the corner of the object and a beam being directed onto the corner of the image, respectively, which beam passes through the lens system with a still acceptable vignetting. The corner of the object is the end of a diagonal of the image written on the display window of the picture display tube. The corner of the image is the end of the diagonal of the picture formed on the projection screen.

In connection with the increasing demand for projection systems, notably colour television projection systems which can be accommodated in a cabinet having a smaller volume there is an increasing need of a projection lens system having a relatively small focal length, for example smaller than 80 mm because then the overall required optical path length from the display tube to the projection screen is also relatively small. Decreasing the focal length of a projection lens system in a projection system will generally result in that the entrance pupil of the lens system will be located closer to the display screen of the display tube. This means that the object field angle becomes larger and that notably in the corner of the display window light which is emitted in the non-forward directions is received by the projection lens system and thus reaches the projection screen. The picture on the projection screen observed by the viewers then exhibits a variation in brightness from the centre of the picture to the edge thereof. This is a result of the fact that the interference filter in the display tube reduces the amount of light in the non-forward directions. This first variation in brightness is still augmented by a second type of brightness variation which is caused by the larger angle at which the chief ray of a beam originating from the corner of the display tube passes through the projection lens system and by vignetting at the lens elements.

A second result of increasing the field angle is that a colour shading occurs on the projection screen due to the colour-selective effect of the interference filter in the display tube. In this case the colour shading implies that there is a shift to shorter wavelengths, thus to blue, from the centre of the projection screen to the edge.

In order to eliminate the problems of brightness variation and colour shading an interference filter could be arranged in the display tube to pass light of the desired wavelengths at larger angles. However, there will be a considerably smaller gain in brightness while colour shading will still occur.

SUMMARY OF THE INVENTION

The present invention has for its object to eliminate the drawbacks while maintaining the advantages of the use of an interference filter in the display tube and even making better use thereof.

A first lens elements of the projection lens system, viewed from the image end, is constituted by a positive lens element having a first refractive aspherical surface facing the image end and a second refractive surface facing the object end, which second surface is convex and has a centre of curvature located in the image end half of this lens element projection lens system includes a second lens element of negative power and having a concave surface facing the image end and an opposed surface having a curvature adapted to that of the display window. The entrance pupil of the projection lens system is located in the image end half of the first lens element.

The projection lens system has a relatively small focal length, for example 78 mm or 90 mm whilst in addition the field angle as defined in the foregoing is small. In principle the first lens element can ensure that, with the field angle at the image end remaining equal, the field angle at the object end is reduced by a factor which is equal to the refractive index of the material of this element. Viewed in the reverse radiation path, hence from the projection screen to the display tube, the first lens element may form an intermediate image which exhibits substantially no coma and astigmatism.

To reduce the spherical aberration in the intermediate image, the first refractive surface of the first lens element is aspherical.

The aspherical surface of the first lens element, viewed from the image end, is preferably convex in a zone around the optical axis and concave outside said zone.

At the reduced field angle the further imaging in the reverse radiation path, with the beam already rendered converging by the first lens element, can in principle be realized by means of only the second, concave lens element. This element may be referred to as field curvature correction lens element or field flattener. The concave surface of this lens element may be aspherical.

In a projection lens system having only a first and a second lens element the second refractive surface of the first lens element is preferably aspherical.

The remaining aberration in the image formed can then be reduced.

A third bi-convex lens element supplying a part of the overall optical power of the projection lens system may be arranged between the first and the second lens element. The optical power of the third lens element is preferably approximately equal to that of the first lens element.

By addition of the third lens element the numerical aperture can be increased and aberrations can be reduced, whilst the focal length remains equal. In this embodiment of the projection lens system the physical pupil is located closer to the centre of the first lens element in order to prevent vignetting but this pupil is still located in the first portion of this lens element.

In a first embodiment of the projection lens system comprising three lens elements the surface of the third lens element facing the image end may be aspherical. This contributes to a reduction in aberrations of oblique beams in the projection system.

In a second embodiment of the projection lens system comprising three lens elements the surfaces of the first and third lens elements facing the object end are aspherical. This projection lens system thus has four refractive surfaces.

In a most preferred embodiment of the projection lens system, the first lens element has a third surface which is reflective and is located in the radiation path between the first and the second refractive lens surface.

This first lens element may be designated as a folded lens element. The optical path length in this lens element is equal to that in a lens element which is twice as thick, but the required quantity of optically high-grade lens material and consequently the weight amount to only half that of the corresponding thick lens element. In addition the reflecting surface changes the direction of the imaging beam in such a way that the radiation path of this beam can be folded in an optimum manner while maintaining the overall optical path length so that the projection system can be accommodated in a cabinet of relatively small volume.

It is to be noted that U.S. Pat. No. 4,526,442 describes a projection lens system having a reflecting surface. However, in the known system the reflector is arranged between the first and the second lens element and this reflector does not form part of the first lens element. Moreover, the known projection lens system has a relatively large focal length.

Optimum use is made of the inventive idea in an image projection system which is further characterized in that the display window of the display tube, viewed from the image end, is concave and has an angle of curvature $\phi$ wherein $\phi$ is the angle between the normal in the centre of the display window and a line perpendicular to the edge of the display window, which angle $\phi$ has a value in the range between 5° and 25°. By using a concave display window the design of the projection lens system can be simplified. The concave shape of the display window aan increased concentration of the radiation of the display tube in the direction of the entrance pupil of the projection lens system and hence a better light distribution across the projection screen is obtained. By combination of a concave display window and an interference filter in the display tube an improvement of the projected image is obtained which is greater than the sum of the improvements obtained by the separate use of the concave display window and the interference filter, respectively.

The concave display window need not be spherical but may have a different shape, for example an aspherical shape.

It is to be noted that it is known per se from British Patent Application No. 2,091,898 to use a concave display window in order to be able to simplify the design of the projection lens system. However, this Patent Application does not reveal that the light output, notably in the corner of the display window, can be considerably increased by combination of a concave display window and an interference filter between this display window and the luminescent material.

The invention may be used in a projection system with one display tube for forming, for example a black-green image on the projection screen.

The greatest advantage of the inventive idea can be achieved when using it in a colour picture projection device. An embodiment of such a device, which has three separate colour channels which converge on a common projection screen and which are each provided with a display tube and a projection lens system, is characterized in that at least one of the colour channels is provided with an image projection system as described above.

The use of the inventive idea is most desirable in the green channel, because the electron current in the display tube must be large for this channel in order to obtain the desired light intensity. However, the combination of the interference filter and the projection lens system according to the invention may also be arranged in the red channel and possibly in the blue channel.

DETAILED DESCRIPTION OF THE PREFERRED EMBODIMENTS

Figure 1:
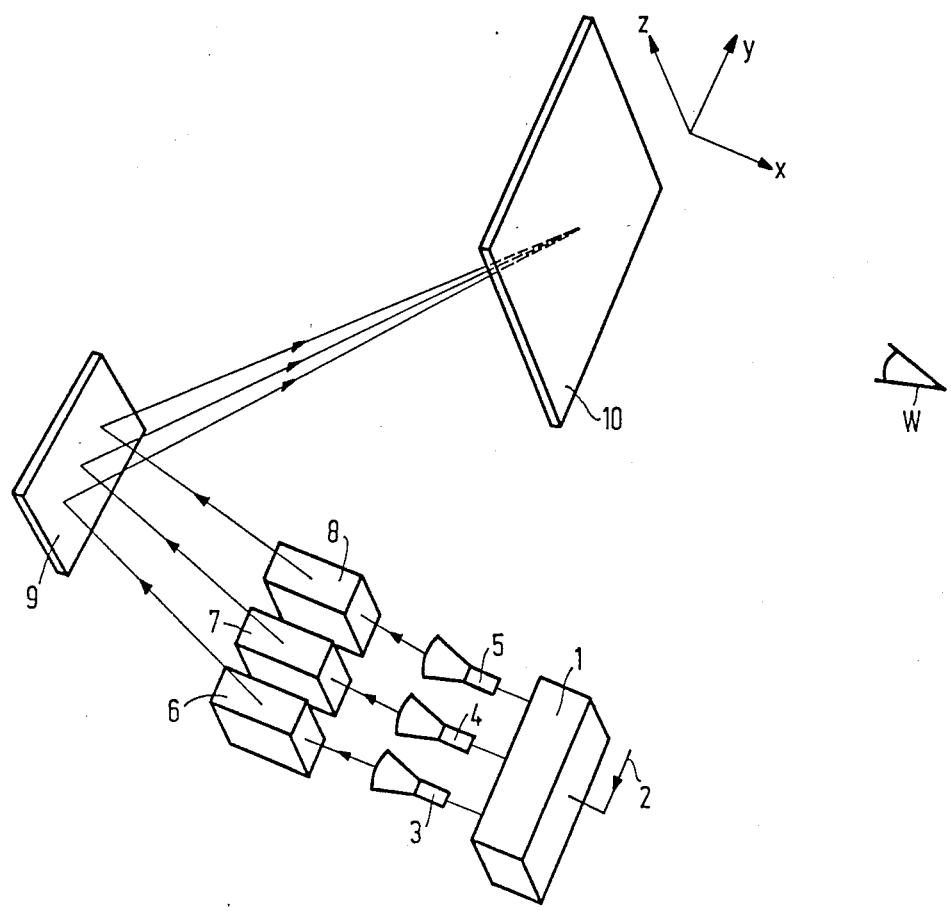
FIG. 1 is a diagrammatic perspective view of a color picture projection device provided with three image projection systems.

FIG. 1 includes a colour television receiver 1. An input of this receiver coupled to an antenna 2 receives a colour television signal which is split up into a red, a green and a blue signal. These signals are applied to three separate display tubes 3, 4 and 5 whose display windows show a red, a green and a blue picture. These pictures are projected on a projection screen 10 by the projection lens systems 6, 7 and 8 shown diagrammatically and associated with the separate tubes. For the sake of clarity only the chief rays of beams imaging a point of a display window on a point of the projection screen are shown. The radiation emitted by each display tube and passing through the associated projection lens system covers the entire projection screen 10. A mirror 9 reflecting the beams emerging from the projection lens systems to the projection screen is arranged between the projection lens systems and the projection screen. This mirror folds the radiation path so that the projection system can be accommodated in a cabinet having a relatively small depth without having to shorten the radiation path.

The three single-colour pictures must be superimposed on the projection screen. To this end the aligned display tubes are slightly bent towards each other, that is to say the normals on the screens of the tubes 3 and 5 extend at a small angle to the normal on the screen of the tube 4.

In the projection screen 10 the radiation of the three beams is dispersed over a relatively large angle in the Y-direction, that is to say in the horizontal direction for the viewer W, while in the Z-direction, the vertical direction for the viewer W, the radiation is dispersed through a smaller angle. The viewer W sees a picture which is the superimposition of the magnified pictures of the display tubes.

Figure 2:
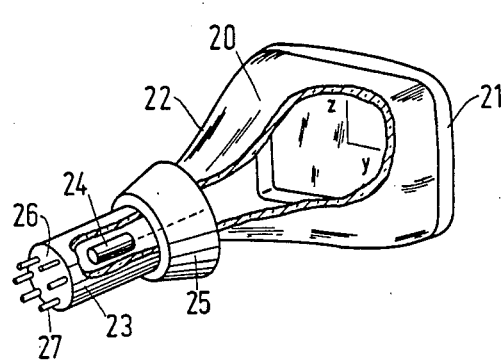
FIG. 2 is a cut away perspective of a display tube for image projection.

FIG. 2 shows one of the display tubes 4 in a perspective view in which a part of the glass envelope 20 is broken away. The glass envelope constitutes a display window 21 on the front side and comprises a cone 22 and a neck portion 23. A luminescent screen not shown in FIG. 2 is provided on the inside of the display window and an electron gun 24 is arranged in the neck of the tube. A system 25 of deflection coils around the neck of the tube ensures that the electron beam scans the luminescent screen in two mutually perpendicular directions Y and Z. The electrical connections to the receiver are established by means of connection pins 27 in the base 26.

Figure 3:
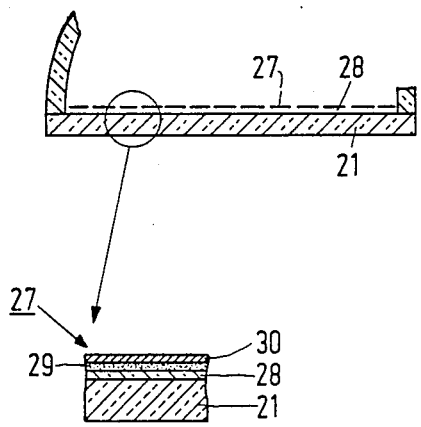
FIGS. 3 and 4 are partial cross-sections of display tubes having straight and curved display windows, respectively, and an interference filter, FIG. 5 diagrammatically shows the composition of the interference filter.
Figure 4:
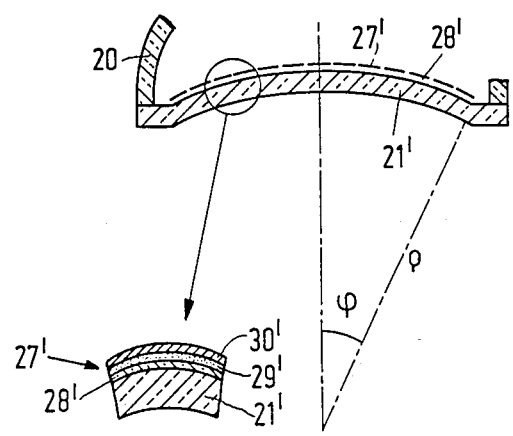

FIGS. 3 and 4 show cross-sections of a flat display window 21 and a display screen 27 and of a concave display window 21' and a display screen 27', respectively. The insets in these Figures show the display windows 21 and 21', the multilayer interference filters 28 and 28' and the display screen 27 and 27', respectively. The display screen consists of a layer of luminescent material, a phosphor 29 and 29' respectively and a thin aluminium film 30 and 30', respectively, the so-called "aluminium backing".

The curved display window of FIG. 4 has an angle of curvature $\phi$ and is preferably spherical with a radius of curvature $\rho$. The display window may be alternatively aspherical, for example.

Figure 5:
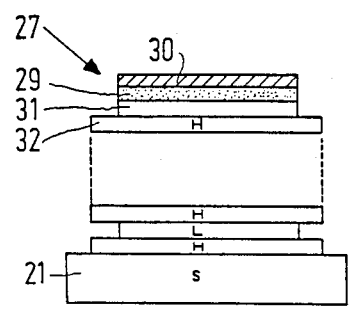

The interference filter is diagrammatically shown in FIG. 5. This filter comprises a large number of layers, for example, twenty alternately having high (H) and low (L) refractive indices. These layers are approximately $0.25\lambda_f$ thick at an average in which $\lambda_f = p \cdot \lambda$ where $\lambda$ is the desired central wavelength which is selected from the spectrum emitted by the luminescent material and where p is between 1.18 and 1.32. The layers L comprise, for example $SiO_2$ having a refractive index $n=1.47$ or $MgF_2$ having a refractive index $n=1.38$. The layers H may comprise $TiO_2$ with $n=2.35$, $Ta_2O_5$ with $n=2.00$ or $Nb_2O_5$ with $n=2.15$. The last layer 32 on the side of the display screen 27 is covered with, for example a $0.125\lambda_f$ thick separation layer 31 having a low refractive index.

For further particulars of the interference filter and embodiments thereof reference is made to the European Patent Application No. 0,170,320 in the name of the Applicant. As is described in this European Patent Application, the provision of the interference filter has the advantages that the quantity of light which is emitted by the display tube within a given solid angle which may be, for example 25° but also 40° can be, for example 40% to 50% larger than in the case of a display tube without such a filter and the intensity of the desired wavelength is increased at the expense of that of the unwanted wavelengths, so that the beam emitted by the tube becomes more monochromatic.

For a projection system as a whole these advantages result in:

a greater brightness on the projection screen, an improvement of the colour in the picture on the projection screen, particularly noticeable in the green colour in the case of a colour picture projector, less chromatic aberration in the projection lens system, particularly noticeable in the green and blue channels in the case of colour picture projection and a better contrast in the picture on the projection screen.

Figure 6:
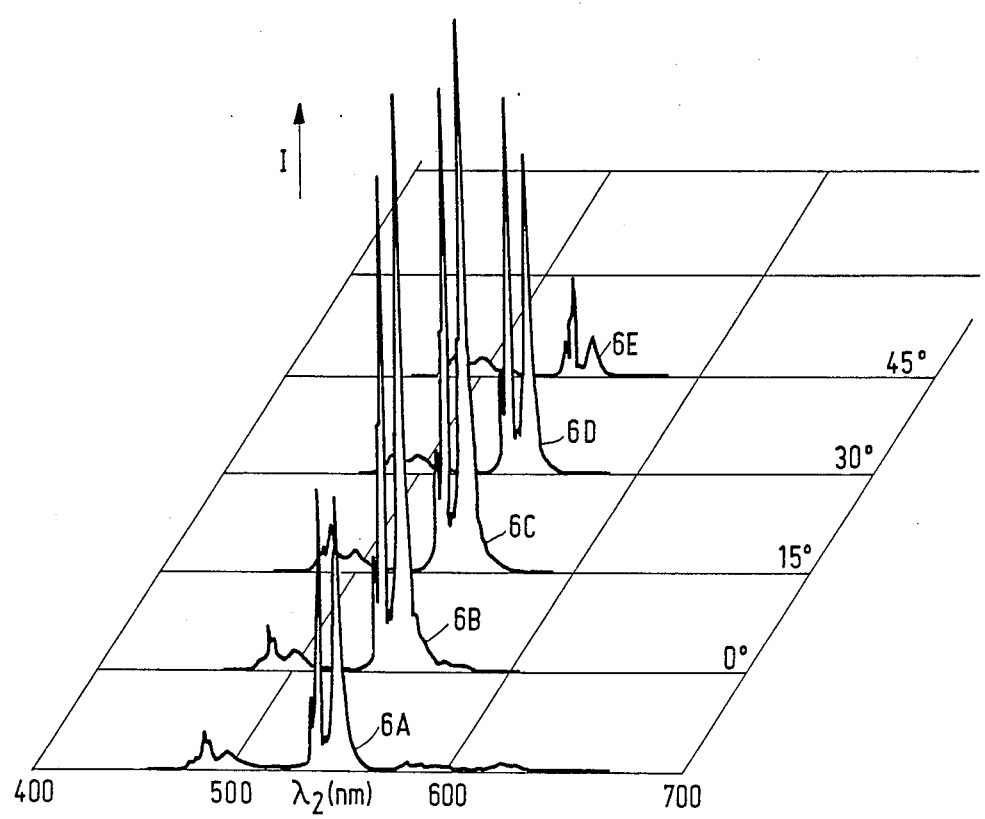
FIG. 6 shows different spectra of radiation emitted by a green phosphor display tube.

For the purpose of illustration FIG. 6 shows by way of example the spectra emitted by the green display tube under different circumstances. The luminescent material of this tube is a phosphor of the composition YAg:Tb. The curve 6A shows the spectrum which is emitted if no interference filter is present in the display tube. The curves 6B to 6E show the spectra which in the presence of an interference filter are emitted in the directions which extend at angles of 0°, 15°, 30° and 45° respectively, to the normal on the display window. A comparison of the curves 6A and 6B shows that the interference filter enhances the brightness of the desired spectral range in the direction perpendicular to the display window, whilst the brightness of the spectral line at 545 nm is enhanced in comparison with the other, blue spectral line at wavelengths of less than 500 nm. These advantages are maintained for directions which extend at angles up to a maximum of 30° to 35° to the normal on the display window as is shown in FIGS. 6c and 6d. Curves analogous to those of FIG. 6, but of course with different spectral lines apply to the blue and the red display tubes. For directions at angles of more than 30° to 35° to the normal the brightness of the green spectral line decreases in FIG. 6, whereas that of the blue spectral line remains approximately equal as is shown in FIG. 6 by the curve 6E which applies to a direction at 45° to the normal on the display window.

Figure 7:
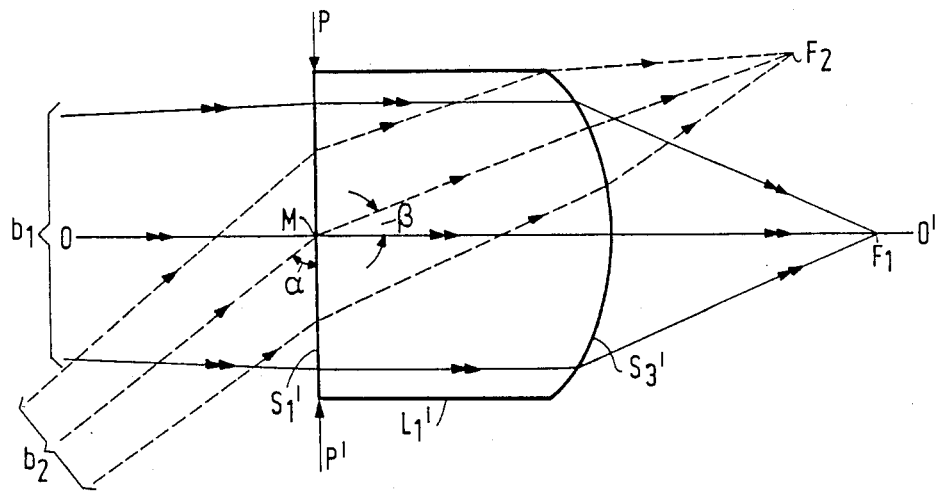
FIG. 7 shows the basic shape of the first lens element.

In order to prevent that colour shading occurs across the projection screen due to the relatively larger contribution of the blue spectral line with respect to the green spectral line and to prevent the brightness decreasing to a considerable extent from the centre of the projection screen to the edge thereof due to the decrease in brightness of the green spectral line, it is ensured according to the invention that light which is emitted at angles of more than 30° to 35° to the normal on the display window is not received by the projection lens system. A projection lens system is provided which has a small field angle at the object and, whilst the focal length is also small. Referring to FIG. 7, a thick plano-convex lens $L_1'$ has convex lens surface $S_3'$ with a center of curvature M located on the flat surface $S_1'$. Although in the projection system the rays extend from right to left, the ray path in FIG. 7 is shown from left to right. This inversion is permitted in this type of optical systems and is used here because it simplified the insight into the operation of the system. The beam $b_1$ shown in FIG. 7 is an imaginary beam which originates from the centre of the projection screen. Due to the relatively large distance between the lens element $L_1'$ and the projection screen the beam $b_1$ is only slightly-diverging. This beam whose chief ray coincides with the optical axis $OO'$ of the lens element $L_1'$ is converged in the point $F_1$ on the optical axis. The reference symbol $b_2$ denotes a likewise imaginary, slightly diverging beam originating from the edge of the projection screen and passes through the lens element $L_1'$ with a still acceptable vignetting. The chief ray of this beam intersects the optical axis in the point M. For this lens element the pupil PP', the entrance pupil viewed from the projection screen, and the exit pupil viewed from the image source, is therefore located at the area of the first refractive surface $S_1'$ of the lens element $L_1'$. The chief ray of the beam $b_2$ is perpendicularly incident on the convex surface $S_3'$ and passes this surface without refraction. The peripheral rays of the beam $b_2$ are refracted towards the chief ray by the surface $S_3'$ so that the beam $b_2$ is focussed in the point $F_2$.

By using a lens element $L_1'$ in accordance with FIG. 7 in a projection system, it is achieved that the field angle at which the edge of the projection screen is viewed by the elements of the projection lens system located between the image source and the lens element is reduced. The field angle is the angle $\alpha$ at which the chief ray of the beam $b_2$ incident on the surface $S_1'$ intersects the optical axis. After refraction by this surface this chief ray extends at an angle $\beta$ to the optical axis. The field angle reduction is given by $$\frac{\sin\beta}{\sin\alpha} = \frac{n_1}{n_2}$$

wherein $n_2$ is the refractive index of the lens material and $n_1$ is that of the surrounding medium. If this medium is air for which $n_1 = 1$ the field angle is reduced by a factor which is approximately equal to $n_2$.

Figure 8:
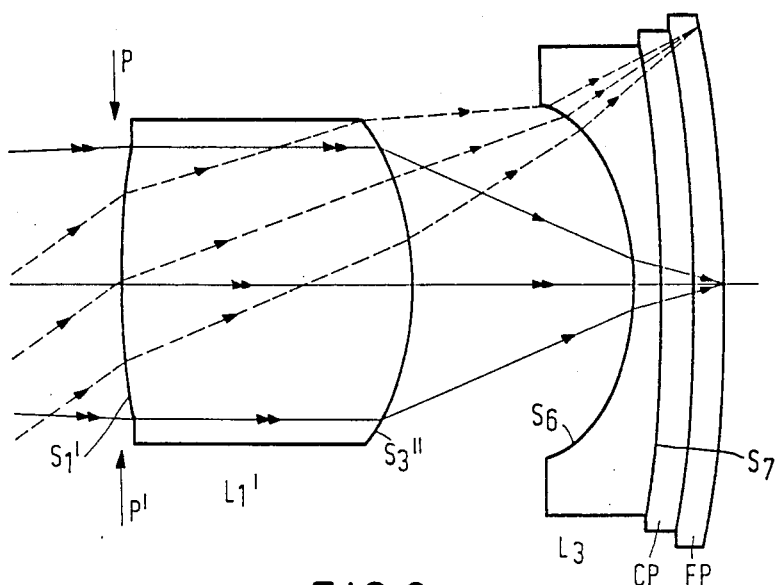
FIG. 8 shows a first embodiment of the projection lens system.

For this reduced field angle and the convergence of the beams brought about by the lens element $L_1'$ the further imaging may be realized with only several simple additional lens elements. In certain uses it would be sufficient to use only a concave lens $L_3$ as shown in FIG. 8. This lens element is the field curvature correction lens or "Field Flattener". The concave surface of the lens element $L_3$ is denoted by $S_6$ in FIG. 8. The curvature of the second surface $S_7$ of the lens element $L_3$ is adapted to that of the display window FP of the display tube not further shown. In the embodiment shown in FIG. 8 this display window and thus also the second surface $S_7$ is concave as viewed from the image end.

A plate-shaped holder CP may be arranged between the display window FP and the surface $S_7$ of the lens element $L_3$. A coolant such as water and glycol flows through this holder since without cooling the temperature of the luminescent material which is provided in the display screen could increase considerably so that the brightness of the tube could decrease.

The lens $L_1'$ may form an intermediate image which is diagrammatically shown in FIG. 7 by the points $F_1$ and $F_2$, which image has substantially no coma and astigmatism but is still beset with spherical aberration. This aberration may be reduced by giving the first surface $S_1$ of the lens element $L_1'$ an aspherical shape. In order to realize a further reduction of aberrations, the second surface $S_3''$ of the lens element $L_1'$ may also be aspherical. Since also the concave surface $S_6$ of the lens element $L_3$ is aspherical, the projection lens system of FIG. 8 totals three aspherical surfaces. This system may have a focal length of 78 mm and a numerical aperture at the object end of 0.30 to 0.35.

Figure 9:
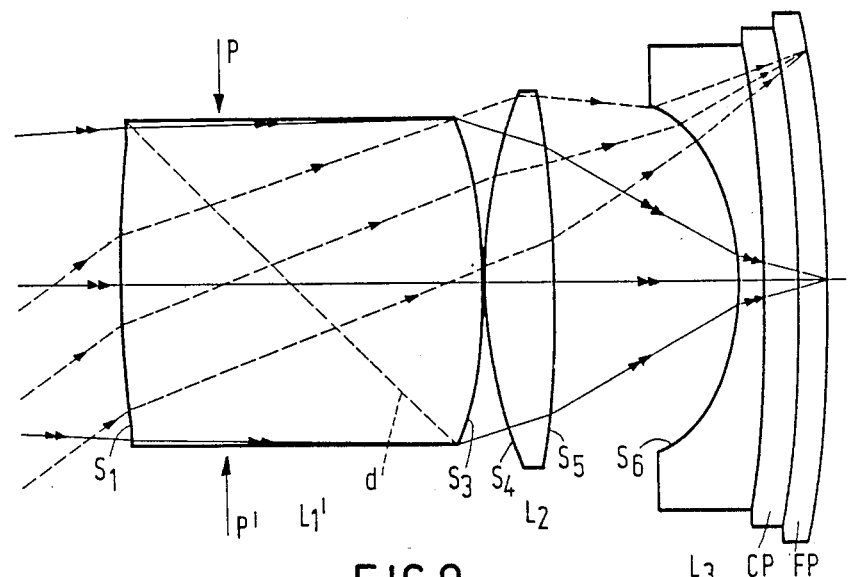
FIG. 9 shows a second embodiment of this projection lens system.

A considerable increase of the numerical aperture and a reduction of aberrations at the same focal length can be obtained by adding a third biconvex lens element. Such a projection lens system, which is not only extremely suitable for projecting present-day television images but also for projecting future high-definition television images, is shown in FIG. 9. The optical power of the projection lens system is now distributed over the first thick lens element $L_1'$ and the third lens element $L_2$. These lens elements preferably have approximately the same optical powers. To this end the lens element $L_1'$ is slightly adapted but its basic shape has been maintained. The pupil PP' of the system is shifted slightly to the object end but is still located fairly close to the first refractive surface $S_1$ so that the field angle reduction is comparable to that which is obtained in the systems according to FIGS. 7 and 8. If the surfaces $S_1$, $S_4$ and $S_6$ are aspherical surfaces, a numerical aperture of more than 0.40 at a focal length of 78 mm can be realized.

The lens element $L_1'$ in FIGS. 7 and 8 is a thick glass lens element and is thus relatively costly and heavy. As already shown in FIG. 9, the projection lens system is designed in such a way that this lens element becomes even slightly thicker so that a diagonal plane d can be provided through the lens element. By leaving out the lens material under this plane, rendering the surface reflective at the location of this plane and providing the surface $S_1$ on the upper side of the lens element, a folded lens element ($L_1$ in FIG. 10) is obtained which exhibits the same behaviour as the lens element $L_1'$ of FIG. 9. The folded lens element $L_1$ has the advantage that it requires half the quantity of optically high-grade lens material needed for the lens element $L_1'$ of FIG. 9 so that the folded lens element is considerably lighter and less costly. Besides the surface $S_2$ reflects the projection beam in a direction which is optimum for further folding the radiation path in the projection system.

The surface $S_2$ of the lens element $L_1$ may be rendered reflective by providing a silver layer, for example by means of vapour deposition.

Also in the projection lens system of FIG. 8, having only two lens elements, the first lens element may be replaced by a folded lens element. This projection lens system preferably comprises three aspherical surfaces $S_1'$, $S_3'$ and $S_6$.

Figure 10:
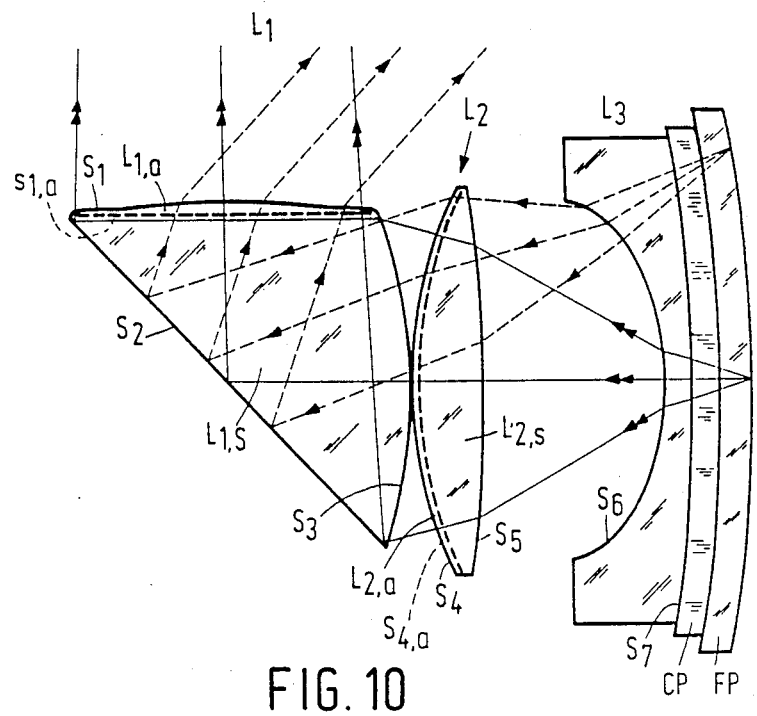
FIG. 10 shows the preferred embodiment of this system.

In the embodiments of FIG. 10 the surfaces $S_1$, $S_4$ and $S_6$ may be aspherical.

The optical behaviour of the lens elements $L_1$ and $L_2$, which determine the optical power and the focal length of the projection lens system, must be independent of variations in temperature or humidity of the surrounding medium. On the other hand these lens elements must have aspherical surfaces which are difficult to realize in glass. Therefore these lens elements preferably consist of glass substrates $L_{1,s}$ and $L_{2,s}$ which on their aspherical sides carry thin layers $L_{1,a}$ and $L_{2,a}$ of a transparent synthetic material with aspherical outer profiles $S_1$ and $S_4$, respectively. $S_{1,a}$ and $S_{4,a}$ are the inner surfaces of the thin layers $L_{1,a}$ and $L_{2,a}$ respectively. Since the layers are thin, a variation of the refractive index or of the shape of these layers as a result of variations in the ambient parameters has only a slight effect on the behaviour of the lens elements as a whole.

The projection lens system according to FIG. 10 may have four instead of three aspherical surfaces, namely the surfaces $S_1$, $S_3$, $S_5$ and $S_6$. A glass having a lower refractive index can then be used for the lens elements $L_1$ and $L_2$.

The aspherical layers may be provided on the lens substrates by means of a so-called replica process. In this process use is made of moulds having inner profiles which are the reverse of the desired outer profiles of the layers to be formed. A transparent synthetic material brought to a sufficiently soft condition, for example, a synthetic material which can be polymerized by ultraviolet radiation is provided on a lens substrate whereafter a mould is pressed into it. Subsequently the synthetic material is cured, for example by irradiation by ultraviolet light and the mould is removed and the lens becomes available without any further processing operations being required.

The correcting lens element $L_3$ may entirely consist of a synthetic material, for example, polymethylmethacrylate (PMMA) or polycarbonate (PC). The aspherical profile on the surface $S_6$ may already be provided during moulding of the lens element by making use of a mould having an aspherical profile. It is alternatively possible to provide the aspherical profile after forming the lens element $L_3$ by means of the replica process.

The aspherical surfaces, for example, $S_1$, $S_4$ and $S_6$ of FIG. 10 may be characterized by $$Z = \sum_{i=1}^{6} a_{2i} Y^{2i}$$

wherein Y is the distance between a point on the aspherical surface and the optical axis of the lens element and Z is the distance between the projection of this point on the optical axis and the point of intersection of the optical axis with the aspherical surface.

The following values apply, from the image end, to the axial surface curvatures C, the axial distances di between these surfaces and the refractive indices n for an embodiment of the projection lens system according to FIG. 10 in which the lens element $L_1$ consists of glass of the type number $SF_2$ from Messrs. Schott and the lens elements $L_2$ and $L_3$ consist of polycarbonate, whose focal length is 78 mm and the numerical aperture is 0.425.

|  |  | C(mm$^{-1}$) | di(mm) | n |
|---|---|---|---|---|
| $L_1$ | $S_1$ | 0.005679 |  |  |
|  |  |  | 84.00 | 1.654 |
|  | $S_3$ | −0.009203 |  |  |
|  |  |  | 0.100 |  |
| $L_2$ | $S_4$ | 0.007552 |  |  |
|  |  |  | 16.00 | 1.573 |
|  | $S_5$ | −0.003645 |  |  |
|  |  |  | 45.48 |  |
| $L_3$ | $S_6$ | −0.015772 |  |  |
|  |  |  | 5.00 | 1.573 |
|  | $S_7$ | −0.028571 |  |  | whilst the aspherical coefficients $a_{2i}$ of the surfaces $S_1$, $S_4$ and $S_6$ are equal to

| $S_1$ | $a_2 = 0.283935 \times 10^{-2}$ |
|---|---|
|  | $a_4 = -0.390136 \times 10^{-6}$ |
|  | $a_6 = -0.750233 \times 10^{-9}$ |
|  | $a_8 = 0.839881 \times 10^{-12}$ |
|  | $a_{10} = -0.564121 \times 10^{-15}$ |
|  | $a_{12} = 0.142924 \times 10^{-18}$ |
| $S_4$ | $a_2 = 0.377615 \times 10^{-2}$ |
|  | $a_4 = 0.301339 \times 10^{-6}$ |
|  | $a_6 = 0.243433 \times 10^{-9}$ |
|  | $a_8 = -0.190848 \times 10^{-12}$ |
|  | $a_{10} = 0.873343 \times 10^{-16}$ |
|  | $a_{12} = -0.138625 \times 10^{-19}$ |
| $S_6$ | $a_2 = -0.788596 \times 10^{-2}$ |
|  | $a_4 = -0.486486 \times 10^{-5}$ |
|  | $a_6 = 0.201054 \times 10^{-8}$ |
|  | $a_8 = -0.821263 \times 10^{-12}$ |
|  | $a_{10} = 0.192444 \times 10^{-15}$ |
|  | $a_{12} = -0.140404 \times 10^{-19}$ |

For an embodiment of the projection lens system according to FIG. 10 in which the lens element $L_1$ consists of glass of the type number SFH64 and the lens elements $L_2$ and $L_3$ consist of polycarbonate and whose focal length is 90 mm, the following values apply:

|  |  | C(mm$^{-1}$) | di(mm) | n |
|---|---|---|---|---|
| $L_1$ | $S_1$ | 0.003714 |  |  |
|  |  |  | 102.00 | 1.712 |
|  | $S_3$ | −0.007749 |  |  |
|  |  |  | 0.50 |  |
| $L_2$ | $S_4$ | 0.006226 |  |  |
|  |  |  | 19.00 | 1.573 |
|  | $S_5$ | −0.003162 |  |  |
|  |  |  | 57.35 |  |

-continued

|  |  | C(mm$^{-1}$) | di(mm) | n |
|---|---|---|---|---|
| L$_3$ | S$_6$ | −0.011750 | | |
|  |  |  | 5.00 | 1.573 |
|  | S$_7$ | −0.002857 | | | whilst the aspherical coefficients $a_{2i}$ of the surfaces S$_1$, S$_4$ and S$_6$ are equal to

| S$_1$ | $a_2 = 0.185676 \times 10^{-2}$ |
|---|---|
|  | $a_4 = -0.249319 \times 10^{-6}$ |
|  | $a_6 = -0.274689 \times 10^{-9}$ |
|  | $a_8 = 0.181459 \times 10^{-12}$ |
|  | $a_{10} = -0.761700 \times 10^{-16}$ |
|  | $a_{12} = 0.123104 \times 10^{-19}$ |
| S$_4$ | $a_2 = 0.311297 \times 10^{-2}$ |
|  | $a_4 = 0.187661 \times 10^{-6}$ |
|  | $a_6 = 0.297361 \times 10^{-10}$ |
|  | $a_8 = -0.811958 \times 10^{-14}$ |
|  | $a_{10} = 0.241555 \times 10^{-17}$ |
|  | $a_{12} = -0.232393 \times 10^{-21}$ |
| S$_6$ | $a_2 = -0.587496 \times 10^{-2}$ |
|  | $a_4 = -0.336531 \times 10^{-5}$ |
|  | $a_6 = 0.156573 \times 10^{-8}$ |
|  | $a_8 = -0.690708 \times 10^{-12}$ |
|  | $a_{10} = 0.203958 \times 10^{-15}$ |
|  | $a_{12} = -0.266676 \times 10^{-19}$ |

Thanks to the novel design of this projection lens system the distance between the display window and the entrance pupil of this system can be increased by a factor of, for example 1.25 as compared with a conventional projection lens system. This increase in distance results in a reduction of the angles at which the chief rays of the beams which originate from the display tube and are accepted by the projection lens system are passed. For the purpose of comparison the following Table shows the angles of acceptance $\alpha_{acc}$ for different relative position P$_{FP}$ on the display window for a conventional projection lens system PL$_C$ and for a projection lens system PL$_I$ according to the invention with a focal length of both 78 mm and 90 mm.

|  | f = 78 mm | | f = 90 mm | |
|---|---|---|---|---|
| P$_{FP}$ | $\alpha_{acc}$-PL$_C$ | $\alpha_{acc}$-PL$_I$ | $\alpha_{acc}$-PL$_C$ | $\alpha_{acc}$-PL$_I$ |
| 0 | 0.0 | 0.0 | 0.0 | 0.0 |
| 0.25 | 10.7 | 10.2 | 8.8 | 6.7 |
| 0.50 | 20.5 | 20.3 | 17.1 | 13.8 |
| 0.75 | 29.2 | 27.9 | 24.9 | 20.2 |
| 1.00 | 37.6 | 31.2 | 32.8 | 24.0 |

These values apply to a display window having a radius of curvature $\rho = 350$ mm.

The angle of acceptance at a given position on the display window is the angle between the normal of this position on the display window and the chief ray of a beam starting from this position and passing the projection lens system.

The effect of the improved projection lens system is greatest in the corners of the display window for which the relative position P$_{FP}$=1.00 for which position also the field angle is defined. The reduction of the angle of acceptance in the corner of the display window is thus 6.4° and 8.8° for a projection lens system having a focal length of 78 mm and 90 mm, respectively.

Figure 11:
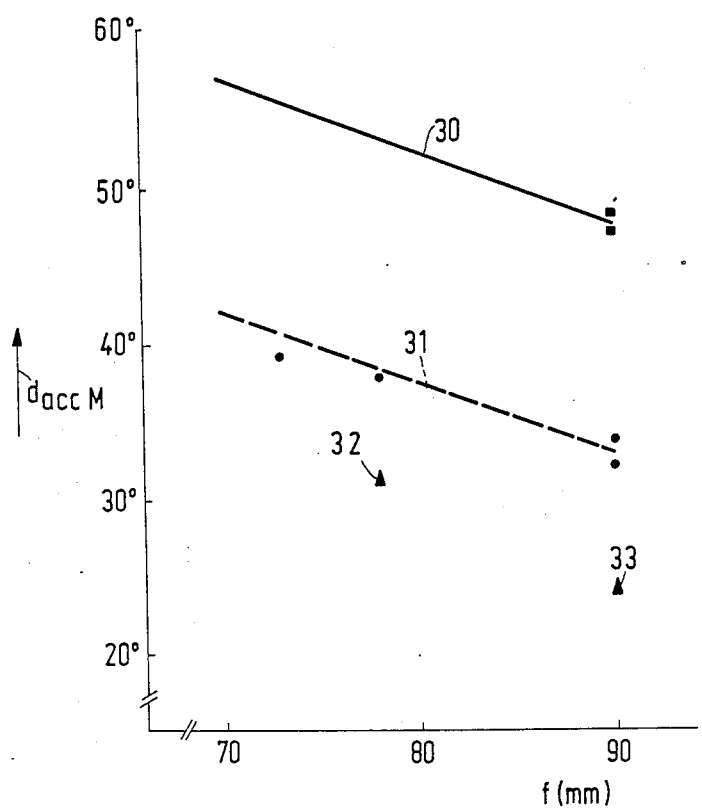
FIG. 11 shows the magnitude of the angle of acceptance as a function of the focal length of the projection lens system in projection systems having a conventional and the novel projection lens system, respectively.

In FIG. 11 the angle of acceptance $\alpha_{acc,M}$ in the corner of the display window is plotted as a function of the focal length f of a conventional projection lens system for both a display tube having a flat display window, the solid-line curve 30, and a display tube having a concave display window with a radius of curvature $r_c = 350$ mm, the broken-line curve 31. In this Figure is also indicated by the points 32 and 33 the maximum angles of acceptance $\alpha_{acc,M}$ for the wavelengths 78 mm and 90 mm in a projection system having a display tube with a concave display window in which $r_c = 350$ mm and a projection lens system according to the invention.

Figure 12:
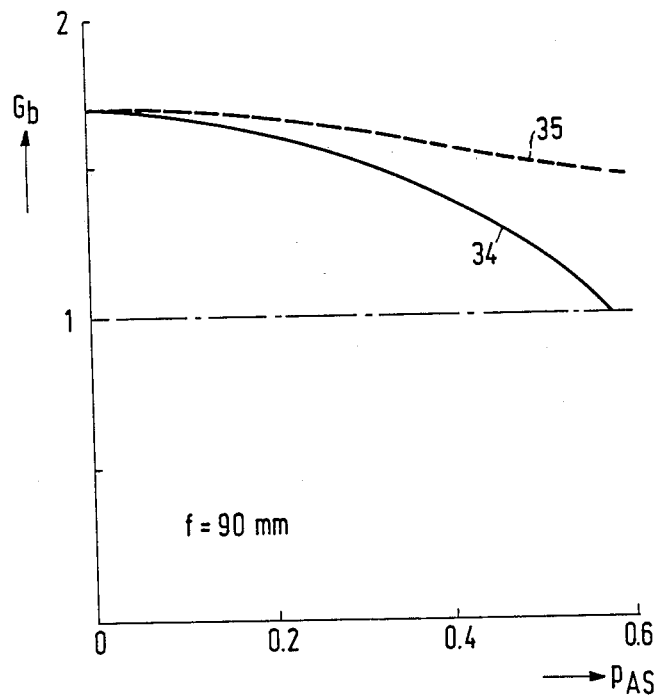
FIGS. 12 and 13 show the difference in brightness variation across the projection screen when using a conventional and the novel projection lens system.
Figure 13:
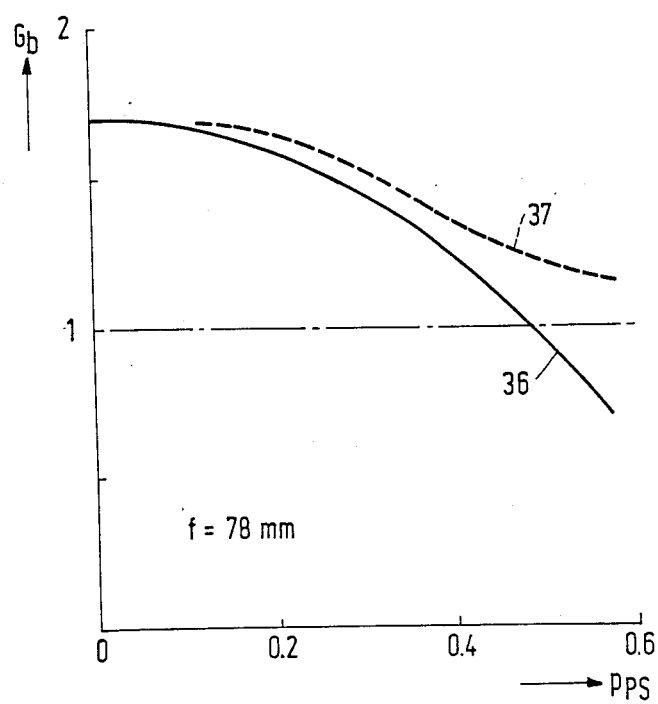

FIGS. 12 and 13 show the effect of the reduction of the angle of acceptance on the gain in brightness G$_b$ which is obtained when using an interference filter (with p=1.26) in the display tube. In these Figures the relative position P$_{PS}$ on the projection screen is plotted in the horizontal direction. The solid-line curves 34 and 36 apply if a conventional projection lens system is used and the broken-line curves 35 and 37 apply when using a projection lens system according to the invention. As is shown FIG. 12 relates to a projection lens system having a focal length f=90 mm and FIG. 13 relates to a system with f=78 mm.

The transmission of the interference filter for the selected central wavelength $\lambda$ is 50% for a direction at 37° to the normal on the display window.

When using a conventional projection lens system with f=90 mm, the gain in brightness G$_b$ in the centre is 1.7 and it decreases to 1.0 in the corner of the projection screen. This decrease in brightness is accompanied by a colour shading which cannot be shown in FIG. 12. When using a projection lens system according to the invention with a folded first lens element the decrease in the gain in brightness is considerably less: from 1.7 in the centre to 1.5 in the corner of the projection screen. If a conventional projection lens system with f=78 mm is used the gain in brightness is 1.7 in the centre and 0.7 in the corner of the projection screen as is shown in FIG. 13. Considerably better results are achieved when using a projection lens system according to the invention with a folded first lens element: the brightness at the edge of the projection screen is then still 1.15 whilst the colour shading is considerably reduced.

Although FIGS. 8, 9 and 10 show image projection systems with display tubes having a concave display window, the invention is not limited thereto. Also in projection systems in which the display tubes have for example a flat display window a combination of the special projection lens system and the interference filter in the tube may increase the brightness on the projection screen and the colour shading may be reduced at a relatively short focal length of the projection lens system.

The invention may not only be used in a colour picture projection system but also in a single colour projection lens system in order to improve the distribution in brightness on the projection screen, to increase the gain in brightness, to realize a better contrast and to reduce chromatic aberrations.

I claim:

1. An image projection system comprising at least one display tube and a multi-element projection lens system for imaging a display tube picture on a projection screen, said lens system having an image end toward said screen, an object end toward said display tube, and a radiation path extending therebetween, said display tube comprising a display screen in an evacuated envelope, the display screen being arranged on the inside of a display window in the wall of the envelope and being provided with a luminescent material, a multi-layer interference filter being arranged between said luminescent material and the display window, characterized in that a first lens element of the projection lens system, viewed from the image end, is of positive power and has a first refractive aspherical surface facing the image end and a second refractive surface facing the object end, which surface is convex and whose centre of curvature is located in the half of said first lens element toward said image end, in that the projection lens system further comprises a second lens element of negative power having a concave surface facing the image end and an opposed surface having a curvature adapted to that of the display window and in that the projection lens system has an entrance pupil located in the image end half of the first lens element.

2. An image projection system as claimed in claim 1, wherein the first refractive aspherical surface of the first lens element, viewed from the image end, is convex in a zone around the optical axis and is concave outside said zone.

3. An image projection system as claimed in claim 2, wherein the second refractive surface of the first lens element is aspherical.

4. An image projection system as claimed in claim 1 further comprising a third bi-convex lens element supplying a part of the overall optical power of the projection lens system and arranged between the first and the second lens elements.

5. An image projection system as claimed in claim 4, wherein the optical power of the third lens element is approximately equal to that of the first lens element.

6. An image projection system as claimed in claim 4 wherein the surface of the third lens element facing the image end is aspherical.

7. An image projection system as claimed in claim 4 wherein the surface of the first and third lens elements facing the object end are aspherical.

8. An image projection system as in claim 1 wherein the first lens element has a third surface which is reflective and is located in the radiation path between the first and the second refractive surfaces.

9. An image projection system as in claim 1 wherein the display window of the display tube, viewed from the image end, is concave and has an angle of curvature $\phi$ wherein $\phi$ is the angle between the normal in the centre of the display window and a line perpendicular to the edge of the display window, which angle $\phi$ has a value in the range between 5° and 25°.

* * * * *